United States Patent [19]
Dumortier

[11] 4,080,147
[45] Mar. 21, 1978

[54] DEVICE FOR THE FABRICATION OF HOLLOW PLASTIC BODIES, AND THE HOLLOW BODIES FABRICATED BY MEANS OF THIS DEVICE

[75] Inventor: Thierry M. Dumortier, Liege, Belgium

[73] Assignee: Fabrique Nationale Herstal S.A., en abrege FN, Herstal, Belgium

[21] Appl. No.: 737,690

[22] Filed: Nov. 1, 1976

[30] Foreign Application Priority Data

Nov. 5, 1975  Netherlands ............................ 7512948

[51] Int. Cl.² .............................. B29F 1/04; B29F 1/08
[52] U.S. Cl. .................................... 425/551; 425/552; 425/557; 425/561
[58] Field of Search ............... 425/244, 249, 256, 192, 425/251, 247, DIG. 228, 243, 245, 557, 577, 561, 574, 575, 583

[56] References Cited

U.S. PATENT DOCUMENTS

| | | | |
|---|---|---|---|
| 2,463,401 | 3/1949 | Lyons | 425/251 |
| 2,505,540 | 4/1950 | Goldhard | 425/247 |
| 2,938,232 | 5/1960 | Martin | 425/251 |
| 3,102,304 | 9/1963 | Divers | 425/243 X |
| 3,247,304 | 4/1966 | Ninneman | 425/245 X |
| 3,550,209 | 12/1970 | Carpenter | 425/243 X |
| 3,590,114 | 6/1971 | Uhlig | 425/192 X |
| 3,752,434 | 8/1973 | Herter | 425/249 X |

*Primary Examiner*—Francis S. Husar
*Assistant Examiner*—William R. Briggs
*Attorney, Agent, or Firm*—Bacon & Thomas

[57] ABSTRACT

The invention pertains to a device for the fabrication of hollow plastic bodies, of the type comprising a core carrying plate, a double mould plate, means to inject plastic material into said mould plate and means to press said three plates against each other at the proper time, characterized in that it further comprises a metering plate fixed to one of said mould plates, as well as a hydraulic metering control plate facing said metering plate, said metering plate and hydraulic control plate being so conditioned to introduce, in a first step, a metered quantity of material in said metering plate and to transfer, in a second step, this quantity of material from the metering plate into the mould carrying plate, before the force-dieing resulting from pressing said plates together.

11 Claims, 10 Drawing Figures

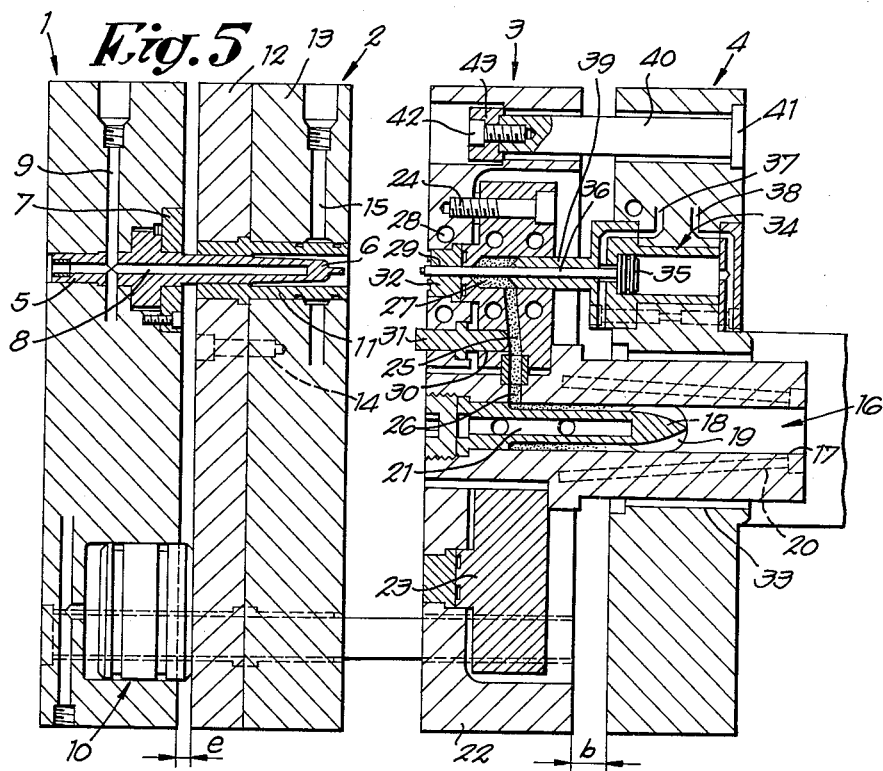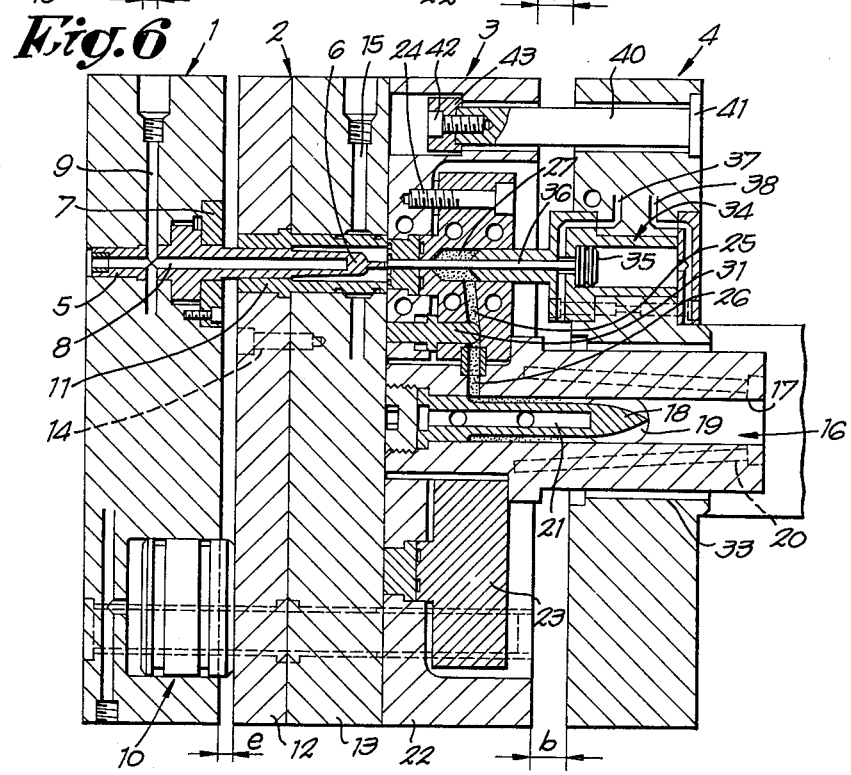

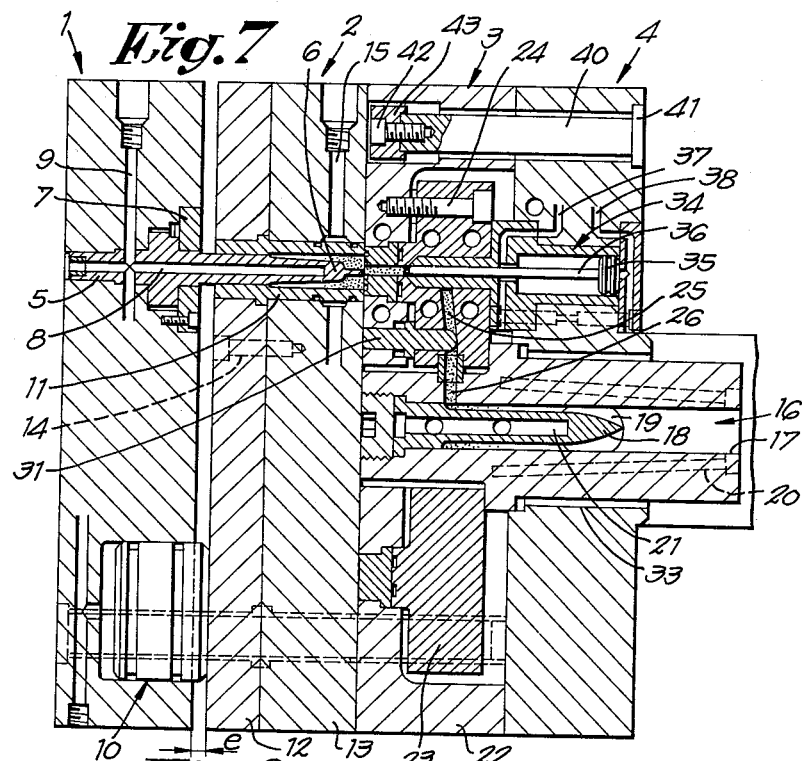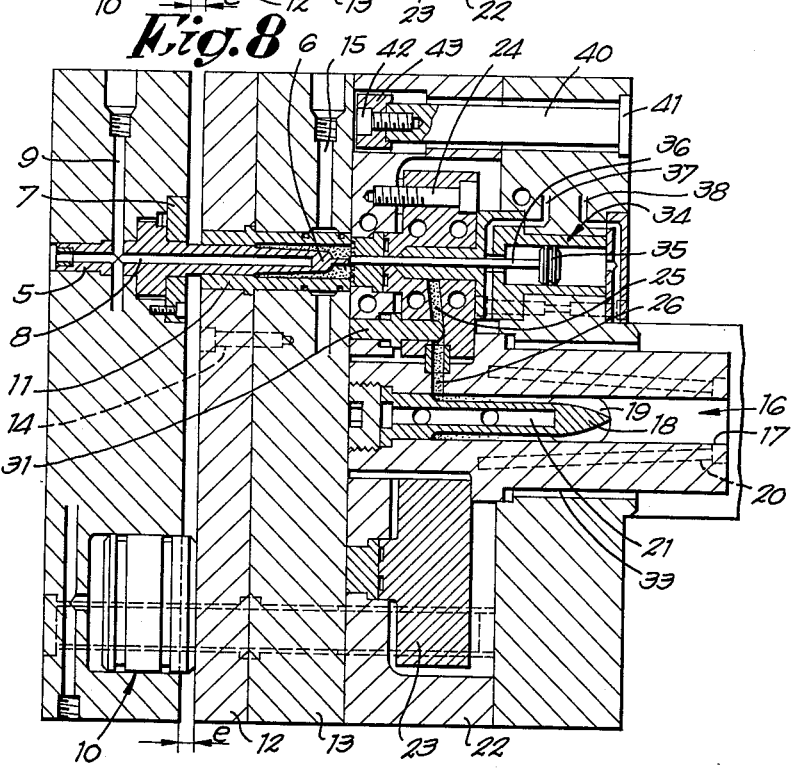

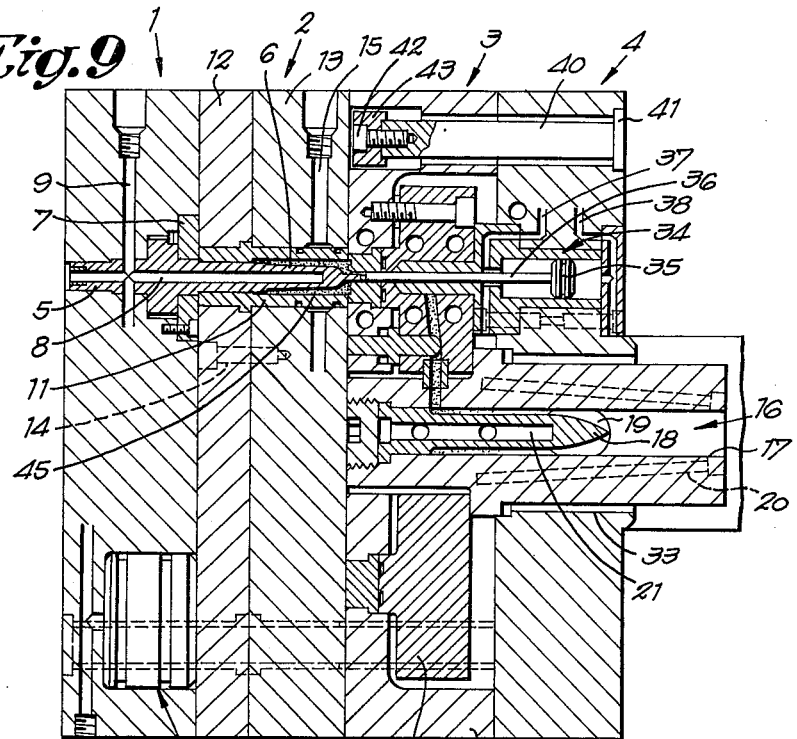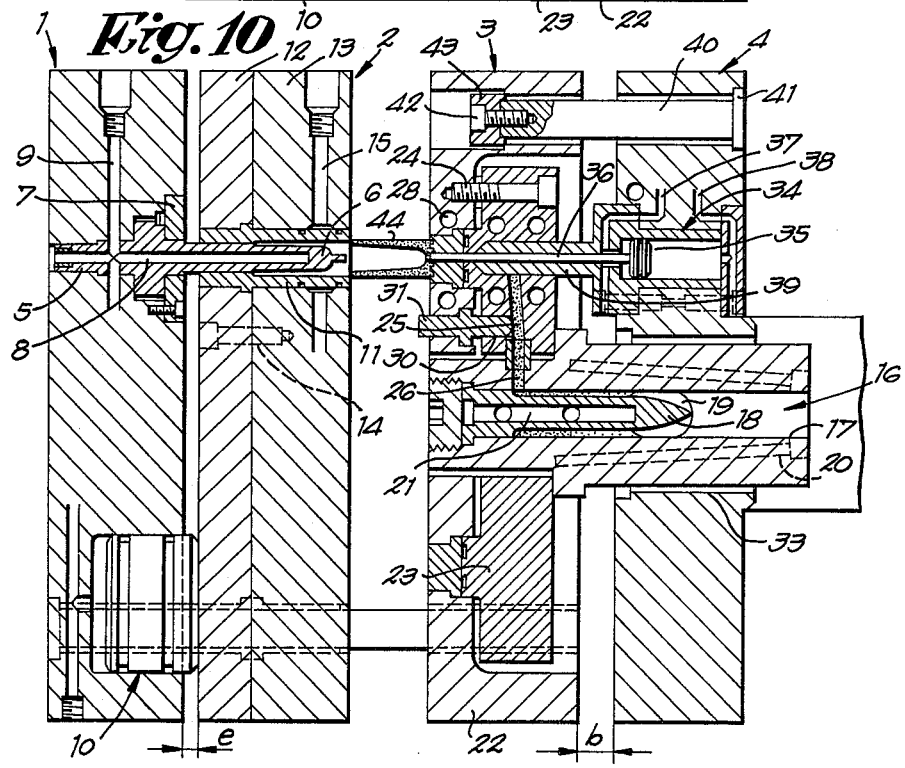

DEVICE FOR THE FABRICATION OF HOLLOW PLASTIC BODIES, AND THE HOLLOW BODIES FABRICATED BY MEANS OF THIS DEVICE

The present invention pertains to the industrial fabrication of plastic bodies, such as more particularly integrally formed casings, consisting of a cylindrical jacket and a bottom, such casings being particularly intended for the fabrication of hunting cartridges. The latter obviously only being an example, considering that the device concerned can easily be adapted for the fabrication of all sorts of similar objects.

Various different devices for the manufacture of hollow plastic bodies have already been proposed, namely for making hunting cartridge cases.

One known device comprises for instance the combination of a core carrying plate, a mould plate, means for injecting plastic material into said mould plate via a supply chamber wherein a cushion of material is constituted. Such a known device only allows pressure mouldings and not a real force dieing which, only, permits obtaining a cristalline orientation of the material — subject to a suitable temperature control of the latter — which leads to a considerable increase of its mechanical properties.

The object of the invention thus is to provide a device permitting easy manufacture of hollow plastic bodies such as cartridge cases, each body being obtained by force-dieing of a strictly metered quantity of material.

This object is achieved by means of a device of the type comprising a core carrying plate, a double mould plate, means to inject plastic material into said mould plate and means to press said three plates against each other at the proper time, characterized in that it further comprises a metering plate fixed to one of said mould plates, as well as a hydraulic metering control plate facing said metering plate, said metering plate and hydraulic control plate being so conditioned to introduce, in a first step, a metered quantity of material in said metering plate and to transfer, in a second step, this quantity of material from the metering plate into the mould carrying plate, before the force-dieing resulting from pressing said plates together.

Such a device allows a perfect control of the temperature of the quantity of material to be force-dieed, considering that the time the material stays in the metering plate and in the mould plate may be chosen before starting with the force-dieing.

It is only by way of example that in the description hereinafter, a device is described allowing the maufacture of four cartridge cases simultaneously.

The device according to the invention comprises four different sub-assemblies, namely a core carrying plate, a mould plate, a metering plate and a hydraulic metering control plate. Each of these four sub-assemblies has its own specific task. Their characteristics and their manner of operation are described and explained below with reference to the appended drawings in which.

Figure 1:
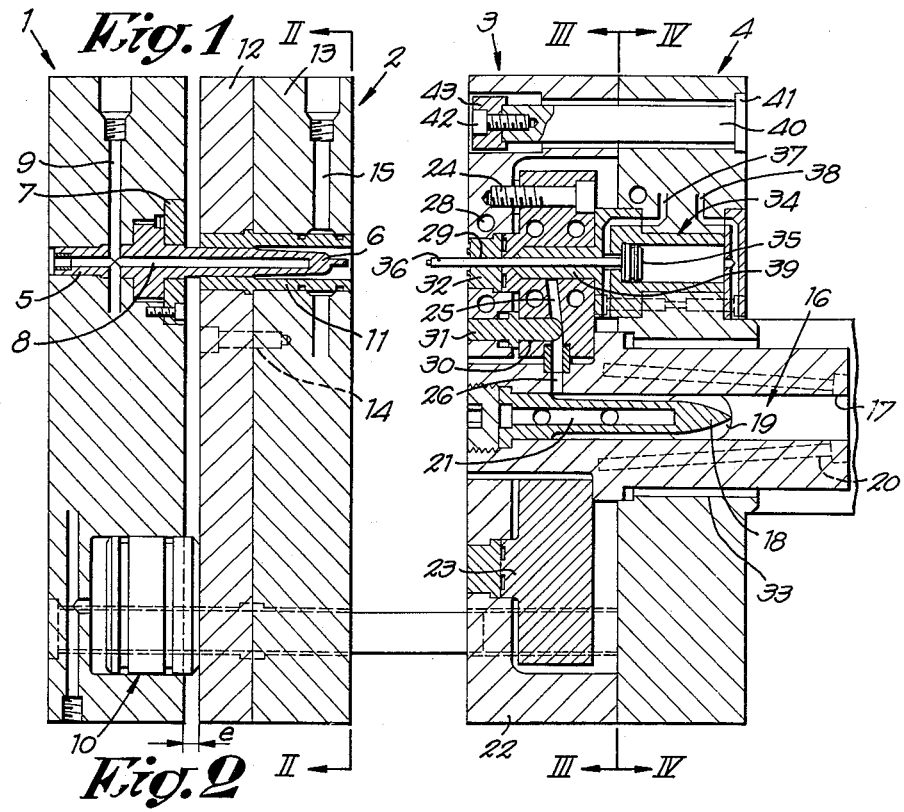
FIG. 1 shows the main parts of the device according to the invention in position of rest or of abeyance.
Figure 2:
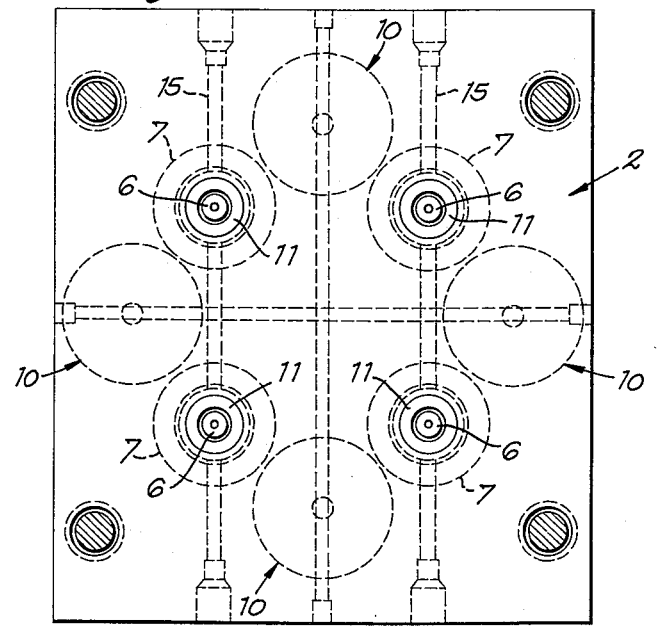
FIGS. 2, 3 and 4 are three sections of the device concerned made respectively according to lines II—II, III—III and IV—IV in FIG. 1.
Figure 3:
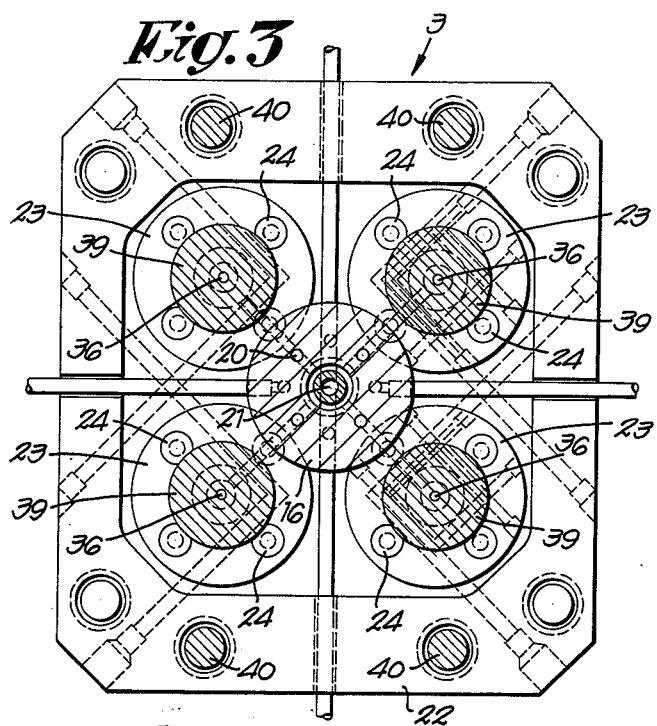
Figure 4:
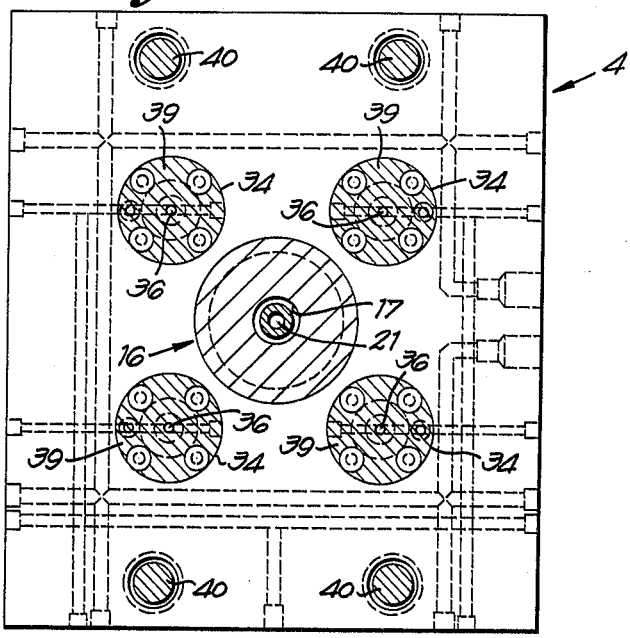

FIG. 5 as in FIG. 1, shows the main parts of the device, in the stage of the plastic material supply;

FIG. 6 is similar to FIG. 1, the device being shown in the metering stage, preceding the injection stage;

FIG. 7 is similar to FIG. 6 the device being at the stage of injection;

FIG. 8 is similar to FIG. 7, but at a stage which is intermediate to the injection stage and the force-dieing;

FIG. 9 is similar to FIG. 8, but at the end of the force-dieing; and

FIG. 10 shows the device in the final stage, i.e., the stage at which the hollow bodies are being removed from the device.

In the following description of an example of a form of embodiment according to the invention illustrated by the appended drawings, the four main sub-assemblies of the device are the core carrying plate 1, the mould plate 2, the metering plate 3 and the hydraulic metering control plate 4. These four plates are located between the pressure plates of a press, whereby the core carrying plate 1 is attached to the mobile plate of the press and the hydraulic metering control plate 4 is attached to the fixed plate of the press. This press, which may be of any well known type, is not shown in the drawings. The device according to the description below is designed for the simultaneous fabrication of four hunting cartridge shells per cycle. Said core carrying plate 1 boasts four bores 5, i.e., one bore per shell to be fabricated, an axial core 6 being fitted in each of bores 5, and being attached to plate 1 by means of a ring 7. Sufficient clearance is provided here to take up expansion. The core 6 is provided with a bore 8, which is connected to a cooling circuit 9, which is only shown here partially and schematically. The core carrying plate 1 is moreover provided with four, in the present case schematically illustrated jacks 10. These are reaction jacks, which are constantly under pressure and are provided with a pressure limiter which sees to it that the pressure does not drop below a determined level. The main task of these jacks is to prevent a lack of sealing of the sealing surface in the course of the formation of the pieces of work in the moulds, a complementary task consisting in maintaining between plates 1 and 2 a predetermined clearance e, i.e., a clearance which corresponds to the required length of stroke for the forming of the pieces of work in the moulds.

The mould plate 2 boasts a number of mould cavities 11, namely one mould cavity per shell, in which aforementioned core 6 fits. This plate 2 consists of two parts 12 and 13, which greatly facilitates the replacement of the mould cavities. These parts 12 and 13 of plate 2 are joined together by screws 14. Part 13 is provided with a cooling ring 15 for mould cavities 11.

The metering plate 3 boasts a central chamber 16, the so-called accumulator, in which an injection mouthpiece, not shown in the drawings, can be fitted for the uninterrupted supply of plastic material. This is a well known system. In the aforementioned chamber (accumulator) 16, a torpedo shaped cooling body 18 is fitted in the well known manner. The purpose thereof is to render the plastic mass which is present therein as homogeneous as possible due to the action of the fins 19 and due also to the fact that the plastic mass which is built up in this manner consists of rather thin annular layers, with a thickness for instance of approximately 5 mm.

Aforementioned chamber 16 and the torpedo shaped body 18 fitted therein are both provided with a cooling ring, respectively 20 and 21, for the purpose of an adequate temperature adjustment. Aforementioned metering plate 3 consists of two main parts, namely a base 22 and a backing plate 23, attached to it by means of screw bolts 24.

This backing plate 23 is provided, for each of the shells to be manufactured, with a channel 25, which connects on the one hand to a second channel 26, and on the other hand to a metering chamber 27, which is coaxial with the corresponding core 6 of core carrying plate 1. The base 22 as well as the backing plate 23 are provided with cooling channels 28, through which flows a cooling substance for the purpose of maintaining the mass of plastic material at as low a temperature as possible which remains compatible with the flowing thereof through opening 29, by means of which the inner space of plate 3 is connected to aforementioned metering chamber 27.

Aforementioned channel 25 connects to an opening 30, in which a valve 31 is fitted for shutting off or opening channel 25.

Around aforesaid opening 29, the base 22 and particularly the auxiliary part 32 are shaped in mould form for the forming of the bottom of the shell foot, so that they are provided at the level of the shell foot with a dovetail groove, which serves to maintain the shell after opening the mould, and consequently before removing the shell.

Plate 4 is provided with a central opening 33 for the free passage of the accumulation chamber 16. Moreover, this plate 4 is also provided, for each shell to be fabricated, with a cylinder 34 with piston 35, extended by a pin shaped appendix 36. The movement of this piston 35 is controlled by a fluid supplied through channels 37 and 38. Aforementioned cylinder 34 is provided at its end towards plate 3 with a protrusion 39, used on the one hand as guide for pin 36, and on the other hand as piston in aforesaid metering chamber 27.

Plates 3 and 4 are joined together by means of rods 40 provided at one end with a head piece 41, and at the other end with an internally threaded axial bore, into which a screw 42 is fitted with interposition of adjustment elements 43. The adjustment in length of these rods 40 determines the content of the metering chamber and the spacing $b$ between plates 3 and 4, which corresponds to the metering stroke.

The device assembled in this manner is fitted to an injection press of the type provided with a fast operating low pressure closing mechanism and a high pressure device with a short stroke.

The above described device according to the invention for the fabrication of hollow objects operates as follows. In the position of rest or of abeyance (FIG. 1), plate 1 is attached to the mobile plate of the press (not shown in the drawing) in such a manner that the distance between plates 1 and 2 corresponds to the required stroke $e$ for forming the shells in the moulds. Plate 4 rests on the fixed plate of the press, and both plates 3 and 4 lie adjacent against each other. In this position of rest, the distance between plates 2 and 3 is quite large; pin 36 is slid forward to its forwardmost position and channel 25 is closed by valve 31. The plastic material for the shaping of the shells is located in aforementioned chamber 16, into which it is injected by some well known injection means, which are not shown here.

The mass of plastic material which has thus been set in motion presses valve 31 back and penetrates into channel 25, through which it reaches the metering chamber 27. During the filling of metering chamber 27, the mass under pressure pushes plate 3 forward, to its most forward position, so that the distance separating plates 3 and 4 has the required value $b$ (see FIG. 5).

After the metering, plates 1 and 2 are jointly shifted towards plate 3, so that plates 2 and 3 come into contact. In the meantime, valve 31 has automatically been displaced towards the rear, so that it shuts off channel 25. The three plates 1, 2 and 3 are then shifted against plate 4, so that the distance $b$, i.e., metering stroke length, becomes zero. So doing, pin 36 is retracted to its rearmost position by piston 35. The consequence hereof is, that piston 39 presses the plastic material out of the metering chamber 27, via opening 29, into the base of the mould cavity 11, in which core 6 is located in its rearmost position. The resistance experienced by the mass of plastic material whilst moving through opening 29 is neutralized and overcome by the kinetic energy of the assembly which moves with great velocity. As soon as metering chamber 27 is empty, pin 36 returns to its foremost position (FIG. 8), where it contacts the end of aforementioned core 6, in order to guide the latter during the shaping of the shell. In so doing, the pin drives the mass of plastic material out of opening 29 into the mould cavity 11. After the displacement of the pin towards the front (FIG. 8), the high pressure device also starts operating, which applies plate 1 against plate 2 (FIG. 9). The pressure is sufficiently high to neutralize the jacks 10, which are fitted with a relief regulator, so as to bring back the stroke length $e$ to zero. At this moment, the core 6 force-dices the still liquid mass of plastic material towards the end of the mould cavity, which is constantly being cooled. As soon as the mass has reached a certain temperature subsequent to its cooling, the device is opened by the removal of the high pressure device of the press, so that consequently the distance returns to its value $e$ due to the effect of the jacks 10. Next, the entire assembly of plates 1 and 2 is returned to its rearmost position by the press (FIG. 10). During this stage of the operating cycle, the shell 44 remains attached to the auxiliary element 32. The device is moreover provided on the outside with a wiping mechanism (not shown) for the removal of the shell or shells at the end of the operating cycle.

I claim:

1. A device for the fabrication of hollow plastic bodies, comprising:
    a first plate having a core member extending therefrom;
    a second plate spaced from and movable toward said first plate and having a mold cavity therethrough with said core member extending thereinto;
    a third plate spaced from and movable toward said second plate and having a metering chamber and a straight passage therefrom aligned with said mold cavity;
    a fourth plate spaced from and movable toward said third plate and having a plunger extending slidably into said metering chamber; and
    means connected to said third plate for supplying plastic material to said metering chamber and means interconnecting said plates so that enforced movement of said fourth plate toward said first plate sequentially causes: said third plate to engage said second plate, said fourth plate to move to said third plate to cause said plunger to force plastic material from said metering chamber into said mold cavity, then to cause said first plate to move to said second plate whereby said core member pressurizes the plastic material in said mold cavity.

2. A device as defined in claim 1 wherein said core member is secured in a bore in said first plate.

3. A device as defined in claim 2 wherein said core member is hollow for receiving a coolant therein.

4. A device as defined in claim 1 including means applying a limited but yieldable force between said first and second plates tending to hold said plates apart.

5. A device as defined in claim 4 including means limiting the separation between said plates.

6. A device as defined in claim 1 wherein said fourth plate is provided with an opening therethrough and said third has an accumulation chamber thereon extending loosely through said opening, a torpedo shaped body in said chamber defining an annular space therearound, and a delivery passage leading from said annular space to said metering chamber.

7. A device as defined in claim 6 wherein passages for coolant are provided in said torpedo shaped body and around said accumulation chamber.

8. A device as defined in claim 1 including coolant passages in said third plate around said metering chamber.

9. A device as defined in claim 6 including a valve for closing said delivery passage.

10. A device as defined in claim 1 wherein said fourth plate is provided with a hydraulic cylinder aligned with said plunger, a piston slidable in said cylinder and having a rod thereon slidable through said plunger and said straight passage and being retractable by said piston from said straight passage into said plunger.

11. A device as defined in claim 1 including stop means limiting the separation of said third and fourth plates to predetermine the capacity of said metering chamber as defined by the axial position of said plunger therein, said stop means being adjustable to selectively change said capacity.

* * * * *